United States Patent [19]

Richard, Jr.

[11] 4,046,411
[45] Sept. 6, 1977

[54] IMPACT ENERGY ABSORBING MOUNTING UNIT FOR MOUNTING AN AUTOMOTIVE VEHICLE BUMPER ASSEMBLY

[75] Inventor: Raymond L. Richard, Jr., Port Clinton, Ohio

[73] Assignee: General Motors Corporation, Detroit, Mich.

[21] Appl. No.: 746,421

[22] Filed: Dec. 1, 1976

[51] Int. Cl.² .................................................. B60R 19/06
[52] U.S. Cl. .................................. 293/88; 267/140; 293/73
[58] Field of Search ................... 293/70, 72, 73, 87, 293/88, 89; 267/139, 140; 114/219

[56] References Cited

U.S. PATENT DOCUMENTS

| | | | |
|---|---|---|---|
| 2,903,289 | 9/1959 | Klix | 293/89 |
| 3,694,019 | 9/1972 | Carter | 293/88 |
| 3,854,765 | 12/1974 | Church et al. | 293/88 |

FOREIGN PATENT DOCUMENTS 1,347,000   2/1974   United Kingdom ................ 114/219

*Primary Examiner*—Trygve M. Blix
*Assistant Examiner*—Charles E. Frankfort
*Attorney, Agent, or Firm*—Charles R. White

[57] ABSTRACT

This energy absorber for use on automotive vehicles has a cylinder slidably mounted in a support bracket to flex a belt of energy absorbing material on bumper impact to dissipate impact energy. The cylinder has integral radial connector straps at its outer end to facilitate bumper attachment. The belt is looped around a pair of pins, one being slidably mounted in a travel slot and the other in an end notch facilitating assembly of the belt into the cylinder. Preferably the energy absorber cylinder and connector straps are made from a one piece stamping rolled into a cylinder and seam welded.

2 Claims, 5 Drawing Figures

IMPACT ENERGY ABSORBING MOUNTING UNIT FOR MOUNTING AN AUTOMOTIVE VEHICLE BUMPER ASSEMBLY

This invention relates to energy absorption units and more particularly to an energy absorber having a cylindrical body with integral connector straps at one end for attachment to a vehicle bumper and with improved construction for mounting a flexible belt of energy absorbing material within the body. This invention further relates to a new and improved method of making an energy absorbing unit.

This energy absorber, which is particularly adapted to mount a bumper to an automotive vehicle, is a light weight unit suitable for a wide range of vehicles of various sizes and weights. The energy absorber incorporates a minimum number of parts which can be easily assembled with any suitable energy absorbing medium into a complete unit ready for use. Basically the energy absorber has improved connection with a bumper beam by integral and radially extending straps formed on an outer end of an energy absorber shell preferably in the form of an elongated cylinder. The cylinder is slidably mounted in a bracket supported by vehicle frame or unibody construction. The energy absorbing medium yieldably connects the cylinder to the vehicle frame or unibody. On bumper impact the cylinder strokes to flex the energy absorber so that impact energy is dissipated. The energy absorber in the preferred embodiment of this invention is a multiwrap belt or band of oriented plastic material which can be tailored to suit varying energy absorbing requirements by increasing or decreasing the number of wraps of the belt. The belt is adapted to be flexed in response to movement of the cylinder relative to a bracket or other support on vehicle bumper impact. The belt has an elastic memory which gradually returns the cylinder and the bumper attached thereto to its original position on removal of the impact load. The shell of the energy absorber of this invention may be readily made by wrapping a one piece metallic stamping containing longitudinally extending tab portions into a cylinder in which guide slots are stamped. After stamping, the cylinder is seam welded and the tabs are bent radially to form a connection with the bumper. The looped belt is inserted within the cylinder in a preload position and then the cylinder is attached to the vehicle frame through suitable bracket structure so that it is ready for operation. This invention provides a superior energy absorber mechanism for mounting a bumper beam to the vehicle and which functions to effectively absorb both frontal and corner impacts and which gradually returns the bumper to its original position after the impact load is removed.

These and other features, objects and advantages of the invention will become more apparent from the following detailed description and drawing in which.

Figure 1:
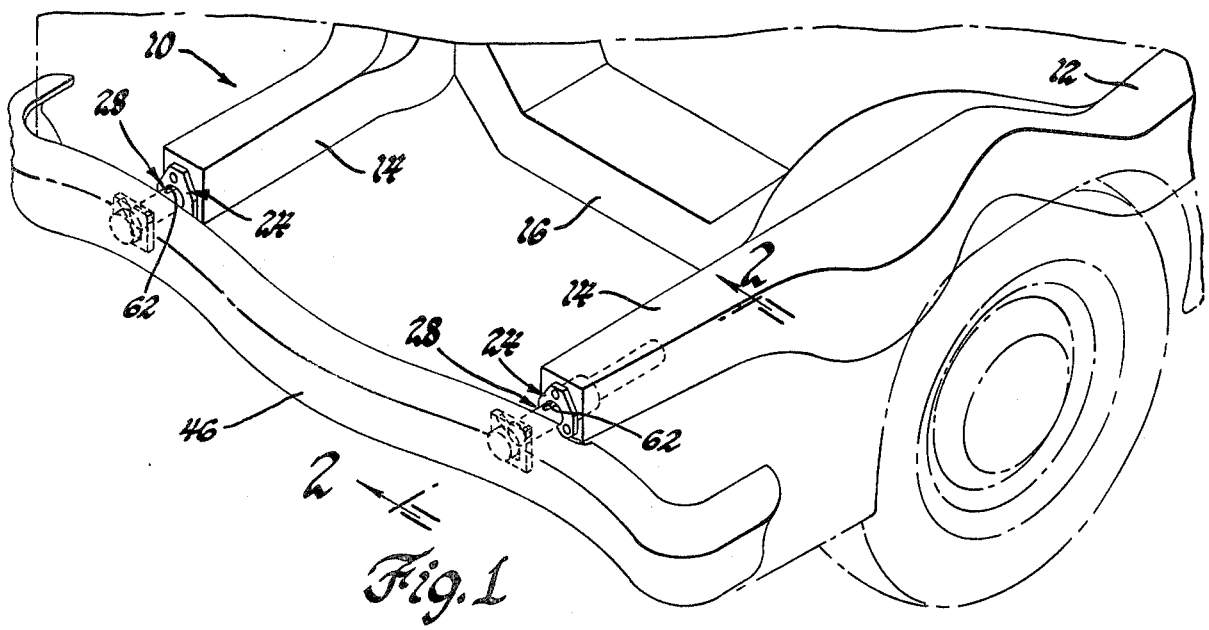
FIG. 1 is a perspective view of an automotive vehicle chassis frame and a pair of energy absorber units mounting a bumper assembly to the frame.

Referring now to FIG. 1 of the drawing, there is a vehicle chassis frame 10 comprising a pair of laterally spaced side rails 12 having forward extending horn portions 14 interconnected by a front cross member 16. The horn portions of the frame 12 are box-like structures and have circular openings 18 in their terminal end walls 20 to receive the tubular bodies 22 of support brackets 24 that slidably support the cylinders 26 of the energy absorber units 28. Each support bracket has a radial flange 30 to fit against the end wall 20 of the associated horn portion and each flange is formed with holes 32 that receive fastener means 34 which are threaded into the end walls 20 of the side rails.

The elongated cylinder 26 of each energy absorbing unit extends from a terminal position within the horn portions of the frame through the sleeve portion 22 of the bracket 24 to an outer end, terminating in three circumferentially spaced and radially extending straps 38 which are integral with the body portion. The straps 38 are formed with holes 40 to receive the fasteners 42 that are threaded into an outer bracket 44 which are secured to front bumper beam 46 by any suitable connector means such as the pivot structure of U.S. Pat. No. 3,700,273 issued Oct. 24, 1972 to Jackson et al. for "Energy Absorbing Bumper System".

Figure 2:
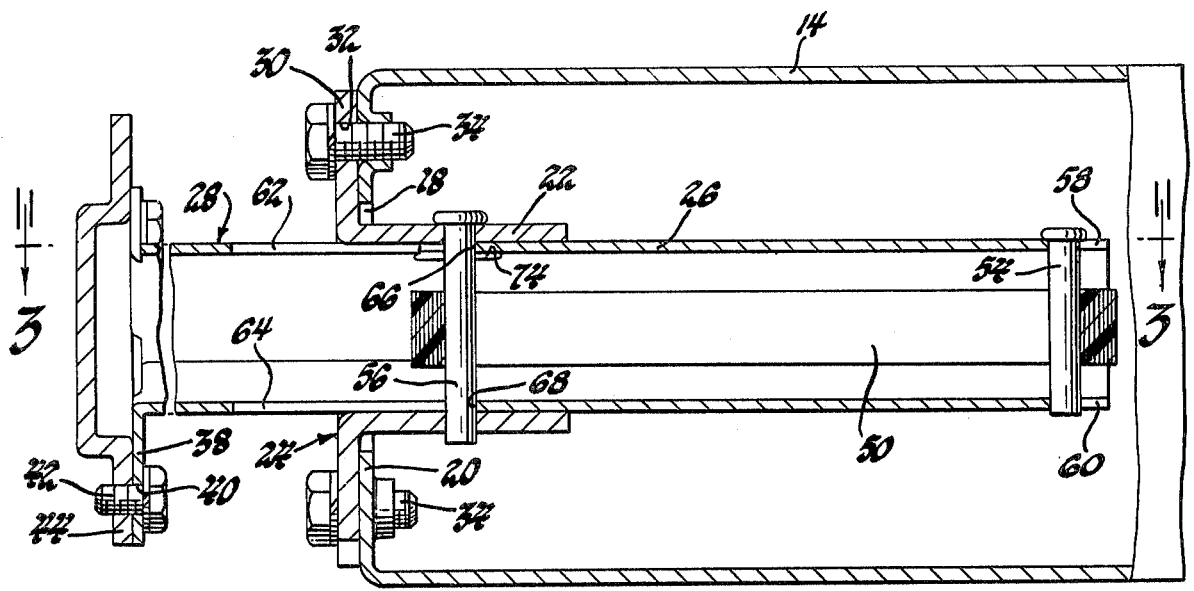
FIG. 2 is an enlarged sectional view taken along the plane indicated by line 2—2 of FIG. 1 showing an energy absorber unit of this invention in its normal extended position.
Figure 3:
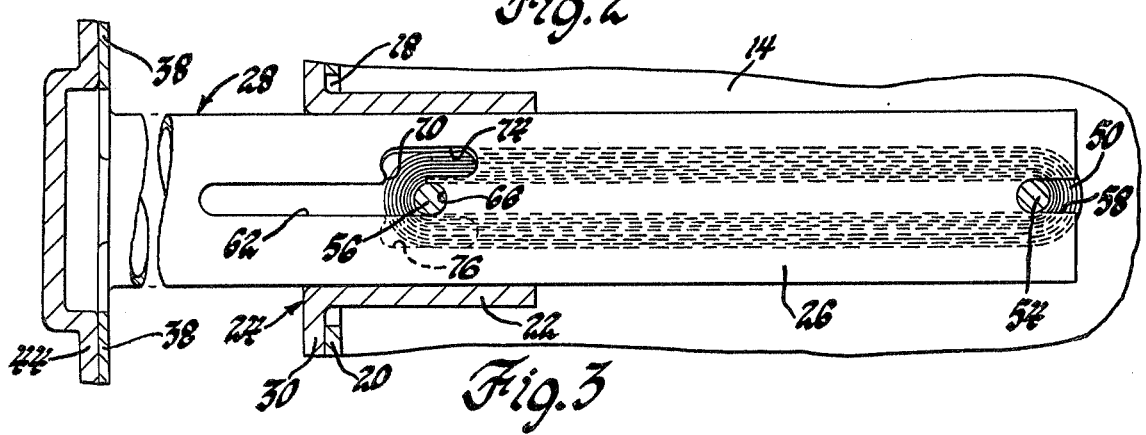
FIG. 3 is a view taken generally along the plane indicated by line 3—3 of FIG. 2.

In contrast to the Jackson et al. patent which utilizes a hydraulic fluid metered through an orifice for absorbing impact energy, the energy absorbing media of this invention comprises a multilayered spring belt 50 of thin oriented plastic material and preferably an oriented copolyetherester elastomer. The belt 50 is made from an elongated strip of such material which is wound onto itself into a multilayered endless loop. The friction properties of the belt are such that the ends of the belt need not be secured to the adjacent belt layers although such joints may be accomplished by a suitable solvent if desired. The belt 50 is operatively mounted in cylinder 26 by a pair of longitudinally spaced pins 54 and 56 which extend through opposite ends of the looped belt. Pin 54 is disposed in diametrically opposed pin retainer notches 58, 60 formed in the terminal end of cylinder 26. Pin 56 projecting diametrically through the sleeve of bracket 24 is disposed in diametrically opposed travel slots 62, 64 which extend longitudinally along the walls of the cylinder. As shown in FIGS. 2 and 3 pin 56 is cradled on seats 66 and 68 formed at the inner end of the travel slots 62 and 64 respectively.

On impact of the bumper beam 46, the cylinders 26 will be stroked inwardly to extend their elastic belts 50 with the pins 54 being moved with their respective cylinders and with pins 56, fixed to the vehicle frame through brackets 24 riding in the travel slots 62 and 64.

It will be noted that inner end portions of the travel slots 62 and 64 communicate by gates 70 and 72 with the end of preload slots 74 and 76 respectively. The preload slots are radially offset in the same direction, with respect to the travel slots so that they are diametrically opposed to each other to facilitate the mounting of the belt within the cylinder in a preload condition for shipping and packaging purposes and so that the device can be readily installed and loaded for action within the vehicle as will be later described.

When the energy absorber unit is installed in the vehicle frame the cylinder 26 is pushed inwardly until the travel pin 56 is lined with the gates 70 and 72; then the cylinder is rotated until the travel pin engages seats 66 and 68. Under these conditions, the belt is initially deflected and ready for energy absorbing action to provide a desirable and predictable force deflection curve which approaches the ideal square wave curve to absorb impact energy.

As soon as the pin 56 moves from its seated position in response to inward bumper movement, the force absorbed approaches a constant value as opposed to energy absorption by an unloaded spring device subject to initial deflection before effective energy absorption action. After the impact load is removed the belt, having good memory, recovers gradually to its original shape to move the bumper outwardly ready for any subsequent impact.

Figure 4:
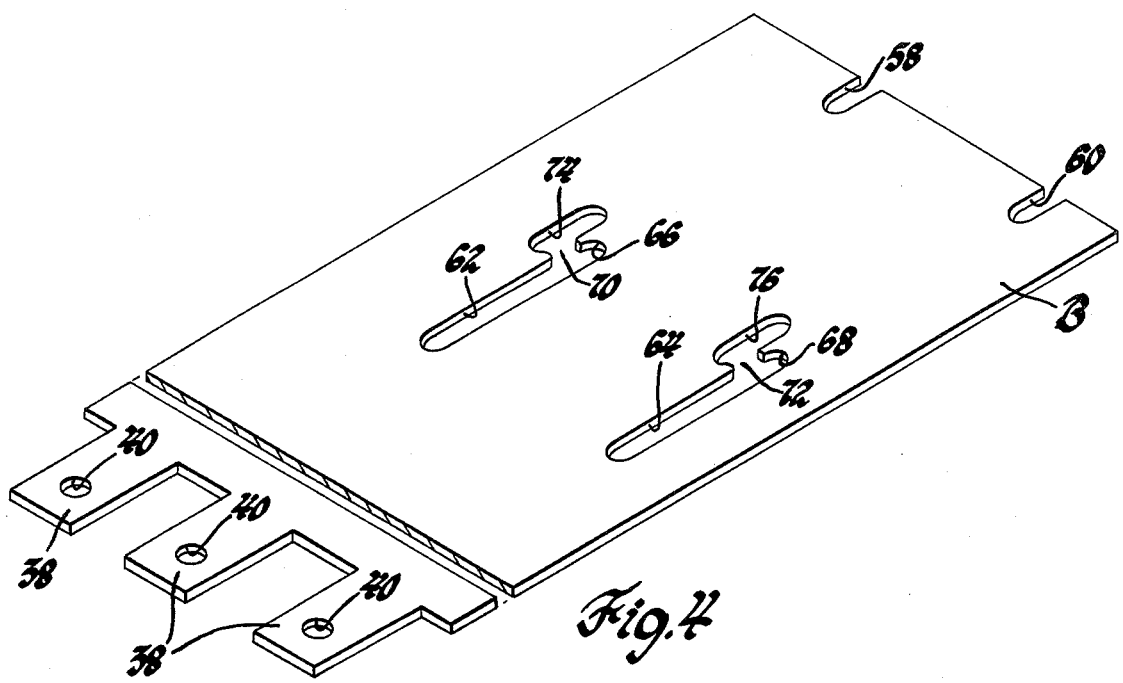
FIG. 4 is a perspective view of a metallic blank utilized to make the outer cylindrical shell of this energy absorber.
Figure 5:
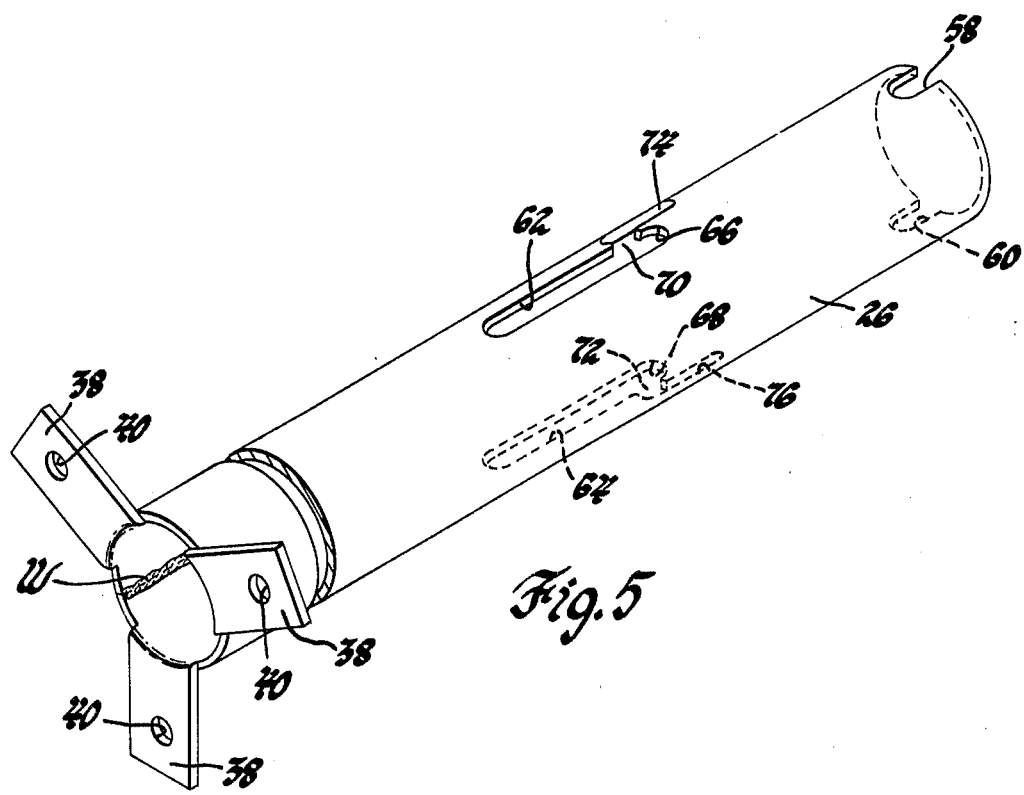
FIG. 5 is a perspective view of the energy absorber outer shell wrapped into a cylinder with integral mounting straps flared radially outwardly for mounting purposes.

FIGS. 4 and 5 illustrate the improved method of making the light weight energy absorbing unit of this invention. More particularly, FIG. 4 shows a generally rectilinear blank B stamped out of sheet stock with the integral and spaced straps 38 projecting longitudinally from one end thereof. The travel and preload slots are punched out of the blank intermediate the ends thereof. End notches 58 and 60 are punched in the end of the blank opposite the strap end to provide important benefits in assembling the belt 50 into cylinder 26. The blank B is then rolled into a cylinder and seam welded at W. After seam-welding the mounting straps 38 are bent at right angles with respect to the cylinder for subsequent connection to the bumper bracket 38. While only the cylinder 26 has been shown with this improved method of manufacture, it will now be appreciated that this method may also be applied to make the bracket 24.

From the above it will be further appreciated that this invention provides a new and improved light weight energy absorber unit for mounting a bumper assembly to an automotive vehicle and that only a minimum number of components are needed in this construction. The cylinder and support bracket with integral attachment straps can be readily stamped out of sheet metal stock with integral attaching straps and with appropriate slots and notches rolled into a cylinder and seam welded. The attachment straps are bent to fit mounting components.

After the parts are made the cylinder is inserted into the sleeve of the bracket. The looped energy absorbing belt is inserted into the cylinder with pin 54 being retained in notches 58 and 60. The belt will extend longitudinally in the cylinder past the inner end of the preload slot so that pin 56 can be inserted in the bracket and in the preload slot to catch the outer loop of the belt. Pins 54 and 56 are held in place by the resiliency of the belt. In this preload condition the belt has a slight twist which is eliminated when the energy absorbing device is conditioned for operation. By holding the bracket 24 stationary and pushing inwardly on the cylinder the pin 56 is moved in the preload slot into alignment with the gates 70 and 72. After this alignment the cylinder is turned relative to the bracket to align the travel slot with the pin 56. The cylinder is then released so that pin 56 fits against the travel slot seat 66 and 68. The belt is thus spring loaded and the energy absorber unit is ready for automotive installation.

While the invention has been described in connection with a preferred embodiment and method, it will be appreciated that various modifications of this construction and method can be made in light of this description and without departing from the spirit of the disclosure or the scope of the following claims:

I claim:

1. An impact energy absorbing unit mounting a bumper assembly to a support on an automotive vehicle comprising a one piece hollow cylindrical body terminating at one end in a plurality of integral mounting straps that extend radially outwardly of said body for attachment to said bumper assembly, means attaching each of said straps to said bumper assembly, said straps being arcuately spaced from one another, said cylindrical body having diametrically aligned notches formed in the other end thereof and further having a pair of aligned elongated tracks extending along opposite sides of said body, a bracket for attachment to said vehicle supporting said body for longitudinal movement therethrough, a first pin mounted in said notches and a second pin extending through said bracket and received in one end of said elongated tracks, resilient energy absorbing means disposed in said cylindrical body and extending around said first and second pins and yieldable in response to an impact load applied to said bumper assembly causing said body to longitudinally move in said bracket to extend said energy absorbing means which dissipates the energy of said impact load, said energy absorbing means providing a force restitution to return said body toward an original pre-impact position in response to removal of the impact load from said bumper assembly.

2. An impact energy absorbing unit mounting a bumper assembly to a support on an automotive vehicle comprising an elongated outer thin walled cylindrical body, said body having a plurality of mounting straps of the same thickness as said body that extend radially outwardly of said body at one end thereof for attachment to said bumper assembly, said straps being arcuately spaced from each other and being integrally formed with said body, means connecting each of said straps to said bumper assembly, said cylindrical body having diametrically aligned notches formed in the other end thereof and further having a pair of elongated tracks extending longitudinally in opposite sides of said body, a bracket for attachment to said vehicle and surrounding said cylindrical body and supporting said cylindrical body for longitudinal movement therethrough, a first pin mounted in said notches and a second pin extending through said bracket and received in one end of said elongated tracks, resilient energy absorbing means in said cylindrical body and extending around said first and second pins and yieldable in response to an impact load applied to said bumper assembly causing said cylindrical body to longitudinally move in said bracket and said elongated tracks to move relative to said second pin to extend said energy absorbing means to thereby absorb the energy of said impact load, said energy absorbing means providing a force restitution to return said cylindrical body toward an original pre-impact position in response to removal of the impact load from said bumper assembly.

* * * * *